United States Patent [19]
Ho et al.

[11] 3,957,504
[45] May 18, 1976

[54] MEMBRANE HYDRO-METALLURGICAL EXTRACTION PROCESS

[75] Inventors: Win-Sow Ho, Wharton; Lester T. C. Lee, Parsippany; Kang-Jen Liu, Somerville, all of N.J.

[73] Assignee: Allied Chemical Corporation, New York, N.Y.

[22] Filed: Nov. 11, 1974

[21] Appl. No.: 522,826

[52] U.S. Cl............................. 75/101 BE; 75/117; 75/121; 75/118 R; 75/119; 75/120; 204/106; 204/109; 23/312 ME; 423/7; 423/24; 210/500 M; 210/21; 210/22 R; 210/23 R; 55/16; 55/158
[51] Int. Cl.$^2$.................... C22B 15/08; C22B 60/08
[58] Field of Search................ 75/101 BE, 117, 121; 204/106, 109; 23/312 ME, 270.5; 55/16, 158; 210/500, 21, 22, 23; 423/24

[56] References Cited
UNITED STATES PATENTS

| | | | |
|---|---|---|---|
| 3,339,341 | 9/1967 | Maxwell et al. | 55/16 |
| 3,428,449 | 2/1969 | Swanson | 75/117 |
| 3,454,490 | 7/1969 | Wallace | 210/22 |
| 3,810,827 | 5/1974 | Kane et al. | 204/105 M |
| 3,855,090 | 12/1974 | Skarbo | 204/106 |
| 3,857,919 | 12/1974 | Hazen et al. | 75/101 BE |
| 3,872,001 | 3/1975 | Davis | 210/58 |
| 3,872,209 | 3/1975 | Hazen et al. | 75/117 X |

OTHER PUBLICATIONS
Zangen, Journal of Inorganic Nuclear Chemistry, Vol. 25, No. 5, Pergamon Press Ltd., Northern Ireland, 1963, pp. 581–594.

*Primary Examiner*—G. Ozaki
*Attorney, Agent, or Firm*—Arthur J. Plantamura

[57] ABSTRACT

A system utilizing membrane extraction is provided to recover metal values. The system may be used to separate metal ions from an aqueous solution through the membrane by an organic liquid containing a chelating agent. This invention also contemplates the recovery of metal values from an organic phase, containing the metal complexed with a chelating agent, by an aqueous phase using membrane extraction. In the former case, the metal ion is passed through the membrane from the aqueous phase to the organic phase where it forms a complex with a chelating agent present in the organic phase. In the latter case the metal is extracted from the organic phase into the aqueous phase through the membrane. In both cases a chelating exchange reaction is involved at the interface between the membrane and one of the two phases. This hydrometallurgical process employs membranes with metal ion diffusivity in the range of about $10^{-5}$ to about $10^{-8}$ cm$^2$/sec. and has advantages over conventional metal extractions and may be applied as the mechanism is pollutant removal and recovery as well as for metallurgical separations.

28 Claims, 4 Drawing Figures

MEMBRANE HYDRO-METALLURGICAL EXTRACTION PROCESS

BACKGROUND OF THE INVENTION

The present invention relates to the application of novel extraction procedures to hydrometallurgical methods for recovery of metals from aqueous solutions using membranes with metal ion diffusivity in the range of about $10^{-5}$ to about $10^{-8}$ cm$^2$/sec.

Liquid-liquid extractions have been a useful means for the separation of various materials. In such systems, in general a liquid solvent C is used to extract a solute (or solutes) from a second liquid B in which the solute is dissolved. Liquids B and C are immiscible or partially miscible.

For a conventional operation, liquids B and C are mixed directly, then separated into two phases. During the direct mixing, however, certain inherent difficulties are present. To illustrate, a foam frequently develops which has the disadvantages, for example, of reducing the mass-transfer rate and prevents a complete phase separation. To increase mass-transfer area in conventional solvent extraction, small drops have to be formed during the mixing. In such cases, the power consumption in processes involving a mixture of the liquid phase is high due to such operations such as mixer-settler, mechanical stirred column, etc. When the drops which occur during the mixing are formed, a back mixing may occur, leading to a reduction of mass-transfer rate. Also, the smaller the size of the drops, the more readily a foam is generated.

In a given system, if the metal is to be extracted from a mixture of solutes, the liquid solvent C, for a conventional operation, is chosen so as to extract the desired metal selectively from other solutes in the liquid B. However, sometimes the selectivity becomes difficult to establish. In addition to the limitations of the conventional solvent extraction mentioned above, solvent loss is high owing to entrainments and hold-up tanks are generally required for phase separations. The present invention, using a membrane system, avoids these and various other drawbacks inherent in conventional solvent extraction techniques.

SUMMARY OF THE INVENTION

The present invention provides a novel hydrometallurgical process for the separation of a metal ion from a solution of its salt using a membrane and in which the extracting solvent contains chelating agent capable of reacting with and holding the desired metal ion until it is subsequently separated from the chelating compound by sequent processing.

In the membrane hydrometallurgical extraction process in accordance with the invention, two substantially immiscible liquids B and C are separated by a membrane, i.e., with no phase-to-phase contact between the two liquids. During the extraction, a solute (or solutes) diffuses from the liquid B into and across the membrane and ultimately passes into the organic phase through a chelating exchange reaction at an interface between the membrane and one of the two liquids.

It is a primary object of the invention to provide a simple, efficient and economic extraction of metal values from an aqueous solution through a membrane. The metal values are accepted into a second liquid containing a chelating agent for said metal.

It is another and more specific object to provide a hydrometallurgical process employing a hollow fiber membrane which has a large mass transfer area per unit volume as the mechanism for selectively extracting a metal from one liquid medium and obtaining it in a chelated complex in a second liquid medium without requiring a direct contact of the two media.

It is also an objectt of the invention to provide a process whereby a specific metal value may be recovered from an aqueous solution containing other metal values and/or contaminants.

Another object of the invention resides in a process for stripping metal values from an organic medium containing a complex of the metal in solution.

Further objects and advantages of the present invention will become apparent from the description of the invention which follows in greater detail, wherein parts and percentages are by weight unless otherwise specified.

BRIEF DESCRIPTION OF THE DRAWING

The hydrometallurgical membrane extraction process will be described in connection with the several figures of the drawing wherein.

DESCRIPTION OF THE PREFERRED EMBODIMENTS

A membrane in a form such as hollow fiber, flat sheet, tubular shape, or other shaped form can be utilized to extract a metal or metals in a liquid phase into another liquid phase by diffusing the metals through the membrane which separates the two liquid phases. The preferred embodiment of the invention contemplates the use of a hollow fiber membrane as the mechanism which separates the liquid phase B (from which the dissolved metal is to be extracted) from the second liquid phase C which extracts the metal from the first liquid phase. One of the two liquid phases is inorganic, e.g. aqueous, the other liquid phase is organic.

In order to effect the hydrometallurgical extraction it is necessary that the extracting liquid phase C contain a suitable chelating agent for the metal to be extracted.

Any of the various industrial or commercially available membranes may be employed which are characterized by apparent high diffusivity, e.g. in the range of about $10^{-8}$ to about $10^{-5}$ cm$^2$/sec, which are chemically stable to the liquid phases and which are mechanically strong may be used.

Several advantages of the hydrometallurgical extraction process of the invention including the use of hollow fibers provided by the invention, hereinafter described in greater detail, may be summarized as follows:

1. The availability of a large mass-transfer area per unit volume, for example, hollow fiber membranes with O.D. 100 microns, I.D. 90 microns, and fiber-to-fiber separation, 20 microns, (see FIG. 3) give $6.7 \times 10^3$ ft$^2$ membrane area (based on O.D.) per 1 ft$^3$ volume.

2. The avoidance of a direct mixing of two phases which thereby eliminates foam generation.

3. Prevention of back mixing of the two solvent phases in which various components in the stream to be processed are selectively extracted by use of different selective membranes in sequence.

4. Superior selectivity — extraction selectivity can be established through a membrane.

5. High purity products.

6. Elimination of entrainments resulting in low solvent loss.

7. Elimination of hold-up tanks — no requirement for further phase separation.

8. Substantially lower power consumption.

9. Flexibility of arrangement of the processing apparatus, i.e., it may be arranged either vertically or horizontally.

Membranes of the level employed in the present invention are the non-ionic and ionic types, preferably ionic.

As a preferred embodiment, the present invention may be effectively carried out by utilizing a continuous countercurrent solvent extraction system, as hereinafter described in greater detail. With such a solvent extraction system, the metal or solute M may be removed economically and efficiently from the solute-bearing solutions. The extraction system can be a single stage as in FIG. 2 in which the metal M initially present in the first liquid phase B is removed by a second liquid phase C, or a multi-stage system for extracting more than one solute separately described, for example, in now abandoned U.S. Pat. No. 320,341 of L.T.C. Lee et al. filed on Jan. 2, 1973, wherein the different metals, e.g. $M_1$, $M_2$ or $M_3$ may be removed in sequence by means of different selective membranes and/or different solvents. In using a hollow fiber membrane, the extracting liquid phase C may be arranged to pass through the hollow fiber and extract metal M from the metal carrying liquid phase B which contacts the hollow fiber outer wall, or vise versa.

Contacting of the hollow fiber membrane and separation of the metal from the metal-bearing solution may be effected within a wide range of pressures or temperatures. However, pressures and temperatures should be used which are practical, i.e. compatible with the overall economic operation of the present process. For example, pressures between 0 psia and 1200 psia or higher and temperatures between freezing points of the solutions and 200°C., preferably ambient pressures and temperatures of 25°C to 75°C, may be used.

The contact times of the extracting liquid phase C on one side of the membrane with the metal bearing liquid phase B on the other side is continued until substantial removal through the membrane into the extracting liquid has been effected.

In accordance with the preferred embodiment, regeneration of the extracting liquid phase C is readily accomplished by back extraction or stripping wherein the metal value is removed from the dissolved complex in the organic phase. Accordingly, loss of solvents through usage of the present invention is minimal and constitutes an important economic advantage of this invention.

In membrane metallurgical extraction, a mass-transfer rate depends on the diffusion flux of solute A through the membrane between two substantially immiscible liquid phases. The diffusion flux can be expressed by Fick's equation as follows:

$$F = D \frac{dc}{dx}, \quad (1)$$

where F = diffusion flux through the membrane; D = diffusivity;

$\frac{dc}{dx}$ = concentration gradient.

Unlike extracting a non-metallic solute as described in said application Ser. No. 320,341, the present invention for hydrometallurgical extraction also advantageously involves extraction with ionic species. Additionally, there are no large molecules of chelating agent and chelating exchange reaction in the above noted application Ser. No. 320,341 as are involved in the present invention. The overall mass-transfer resistance in the membrane hydrometallurgical extraction includes the resistance in the diffusion of metal species from aqueous phase to the membrane; in the diffusion of metal-chelating agent complex molecules in the organic phase, and in the chelating exchange reaction at the interface between the membrane and one of the two phases. Through equation (I), an apparent diffusivity including all these mass-transfer resistances can be obtained by measuring the concentration change in the organic phase and/or in the aqueous phase. An apparent diffusivity (D) in the range of about $1 \times 10^{-9}$ to about $1 \times 10^{-4}$ cm$^2$/sec is required for a given extraction system. Usually a diffusivity higher than $10^{-8}$ cm$^2$/sec is desirable.

In accordance with the invention, several kinds of membranes have been employed in a variety of hydrometallurgical extraction systems and yield desired results. The selection of the optimum membrane may depend on the particular environment of its use, e.g. the diffusivity, the stability of the two liquids ion-exchange capacity, and mechanical strength. Both ionic and non-ionic membrane can be applied where ionic membrane is preferred to use. Typical membranes of the kind which may be employed in practicing the present invention comprises those which contain charged or ionic groups, for example, the cationic membranes will have negative groups such as $-SO_3^-$ (sulfonic) $-COO^-$ (carboxylic), $-PO_3^{--}$ (phosphonic), $-AsO_3^{--}$ (arsenate), $-HPO_2^-$ (phosphoric), $-SeO_3^-$ (selenate), etc.

The anionic membranes will have positive groups such as $-NH_3^+$, $NH_2^+$, $N^+$ (quaternary ammonium groups), $P^+$ (quaternary phosphonium groups) and $S^+$ (sulfonic groups) etc. in the matrix.

The families of synthetic polymeric ion-exchange membranes (including both polycationic and polyanionic) can be used for hydrometallurgical extractions are listed in the following:

1. Heterogeneous Membranes

These membranes are prepared by pressing the ion exchange particles into the plastic film under pressure and heat, such as a resin of polystyrenesulfonic acid powder (>30 mesh) pressed into polyethylene film at 170°C and 500 psi.

2. Homogeneous Membranes

These membranes are prepared from homogeneous resins of sulfonated polystyrene or phenol-sulfonic acid with formaldehyde or polymethacrylic acid.

3. Impregnation

These membranes are prepared by combining two or more separate materials to produce a composite ion-exchange membrane, for example, the cationic membrane is prepared by impregnating α-cellulose sheet with a solution of polystyrene sulfonic acid.

4. Interpolymer Membranes

Interpolymer membranes are formed by the evaporation of solutions containing two compatible polymers with or without a cross-linking agent. For example, the cationic membrane of this type can be prepared from a solution containing polystyrene sulfonic acid, polyvinylidene fluoride and epoxide in dimethylformamide solvent.

5. Graft Copolymerization

Styrene has been grafted onto polyethylene for subsequent sulfonation to form a strong-acid cationic exchange membrane.

6. Mosiac Membranes

These membranes are a type of inhomogeneous composite structure in which the various elements are placed in parallel rather than in series.

7. Polyelectrolyte Complexes

These polyelectrolyte complexe membranes are formed by the interaction of soluble polyanions and polycations as developed by Michaels and coworkers.

The non-ionic membranes used for hydro-metallurgical extraction can be made from polyamides such as nylon-6, or nylon 6—6, from polyamineamide such as poly[1,7(4-methyl)azeheptane adipamide], from polyamide-imide such as poly[1,7-alkylene(2,6-diketopipeazine]1,4-dicarboxamide] or from a mixture of the above materials. The membranes can also be prepared from polypropylene, cellulose acetate, regenerated cellulose and others.

In effecting the hydrometallurgical extraction a suitable chelating compound is employed in the extracting liquid phase C which accepts and forms a complex with the metal ion transmitted through the membrane from the first liquid phase in which it is dissolved. Any of the various known chelating compounds known to form suitable complexes with the specific metals to be extracted may be used. Typical chelating agents and the metal complexes therewith are illustrated in Table I.

TABLE I

| | TYPICAL CHELATING AGENTS FOR HYDROMETALLURGICAL EXTRACTION | |
|---|---|---|
| | Chelating Agent | Metal Extracted |
| 1. | $\begin{array}{c}\text{OH} \quad \text{NOH}\\ | \quad || \\ \text{R}-\text{C}-\text{C}-\text{R} \quad \text{(LIX-63)}\\ | \\ \text{R}''\end{array}$ e.g. 5,8-diethyl-7-hydroxy-dodecane-6-oxime, 19-hydroxyhexatriaconta-9,27-diene-18-oxime, etc. | $Cu^{++}$ |
| 2. | 2-hydroxy-5-dodecyl-benzophenoxime (LIX-64, LIX-64N) | $Cu^{++}$ |
| 3. | Hydroxy benzophenoximes (besides LIX-64) e.g. 2-hydroxy-3'-methyl-5-ethyl-benzophenoxime 2-hydroxy-5-octylbenzophenoxime etc. | $Cu^{++}$ |
| 4. | Chlorinated hydroxy benzophenoximes (LIX-70) e.g. 2-hydroxy-3-chloro-5-dodecyl-benzo-phenoxime, etc. | $Cu^{++}$ |
| 5. | Alkylated 8-hydroxyquinoline (Kelex 100) e.g. 7-n-decyl-8-hydroxyquinoline | $Cu^{++}$ |
| 6. | Alkylated 8-hydroxyquinoline + nonyl phenol (Kelex 120 at 4:1) | $Cu^{++}$ |
| 7. | 8-hydroxyquinoline | $As^+$, Al, $Am^{+3}$, $Ba^{++}$, Bi, Ca, Cd, $Ce^{+3}$ $Fe^{++}$, K, Mg, Mn, Mo, Nb, Nd, Pa, Pb, Pd, $Pn^{+4}$, $Pu^{+6}$, Pr, Rb, $Ru^{+3}$, $Te^{+3}$, $Tm^{+3}$, $W^{+6}$, $Yb^{+3}$, Se, $Sm^{+3}$ $Nd^{+4}$, $Tb^{+3}$, $Ag^+$ |
| 8. | α-benzoinoxime  | $Cr^{+3}$, $Cu^{++}$, $Mo^{++}$, $V^{+5}$, $W^{+6}$ |
| 9. | Dimethylglyoximes $\begin{array}{c}\text{NOH} \quad \text{NOH}\\ | \quad || \\ \text{CH}_3-\text{C}-\text{C}-\text{CH}_3\end{array}$ | $Cu^{++}$, Co, $Fe^{++}$, $Ni^{++}$, Pb, Pd, $Pt^{++}$, Re |
| 10. | Salicylaldoxime  | $As^+$, $Bi^{+3}$, $Ce^{++}$, $Co^{++}$, $Cu^{++}$, $Fe^{++}$, $Mn^{++}$, $Mo^{+4}$, $Ni^{++}$, $Pb^{++}$, $Pd^{++}$, Ti, $V^{+5}$ $Zn^{++}$ |
| 11. | o-Nitrosophenol | Cd, $Co^{+3}$, Cr, $Cu^{++}$, |

TABLE I-continued

TYPICAL CHELATING AGENTS FOR HYDROMETALLURGICAL EXTRACTION

| | Chelating Agent | Metal Extracted |
|---|---|---|
| | | $Fe^{++}$, $Fe^{+3}$, $Hg^{++}$, Mn, $Ni^{++}$, $Pd^{++}$, Pb, Zn |
| 12. |  (naphthenic acids) e.g. (penta-methyl)-cyclopentyl-octanoic acid | $Fe^{+3}$, Al, Zn, $Fe^{++}$, Co, $Mn^{++}$, Mg, Ca, Ni |
| 13. | Naphthenic acids + amine, e.g. naphthenic acids + n-octyl-amine | $Cu^{++}$ |
| 14. | Naphthenic acids + nonyl phenol | $Cu^{++}$ |
| 15. | Naphthenic acids + LIX-63 | $Cu^{++}$ |
| 16. | $R_1\text{—}\overset{\overset{\displaystyle CH_3}{|}}{\underset{\underset{\displaystyle R_2}{|}}{C}}\text{—COOH}$ (Versatic acids with $R_1$, $R_2$ = $C_4 \sim C_5$) e.g. 2-methyl-2-butyl hexanoic acid | $Cu^{++}$, Ni, Co, $Fe^{+3}$, Na, Sr |
| 17. | α-bromododecanoic acid | $Fe^{+3}$, Cu, Zn, Ni |
| 18. | n-octanoic acid, carboxylic acid $C_7 \sim C_9$ | Co, Y, Sn, Bi |
| 19. | Hexadecanoic acid | U |
| 20. | Decanoic acid | Cu, $Fe^{+3}$, Co, $In^{+3}$, $Al^{+3}$, $Pb^{++}$, Ni |
| 21. | 2,2-dimethylpropanoic acid | $Cu^{++}$ |
| 22. | Tributylphosphate | U, Sn, In |
| 23. | Trioctylphosphate | Y |
| 24. | Methyl-isobutyl ketone | Hf, Ta |
| 25. | di-(2-ethylhexyl)-phosphoric acid | U, Co, $Fe^{+3}$, Eu |
| 26. | di-(2-ethylhexyl)phosphoric acid + tri-n-octylphosphine oxide | U |
| 27. | tri-n-octylphosphine oxide | U, Th |
| 28. | 1-amino, 1,1-di-methyl-3,3-di-methyl-5,5-dimethyl-7,7-dimethyl-9,9-dimethyl-decane | $Fe^{+3}$ |
| 29. | N-dodecenyltrialkylmethylamine e.g. N-dodecentyltriethylmethyl-amine | U, $Hg^{++}$, |
| 30. | N-dodecyltrialkylmethylamine e.g. N-dodecyltriethylmethylamine | U, $Hg^{++}$ |
| 31. | tridodecylamine | U, Fe |
| 32. | $R_3N$ (R = $C_8 \sim C_{10}$ e.g. trinonylamine, tri-n-octylamine, etc. | U, Fe, Ta, Nb, $Hg^{++}$ |
| 33. | tri-n-octylamine ($R_3N$, R = $C_8 \sim C_{10}$) + alkylphosphoric acid e.g. tri-n-octylamine + di-n-butyl-phosphoric acid | $Cr^{+4}$ |
| 34. | $R_3N \cdot HCl$ (R=$C_8 \sim C_{10}$) e.g. tri-n-octylamine hydro-chloride | Fe |
| 35. | $CH_3R_3N^+Cl^-$ (R=$C_8 \sim C_{10}$) e.g. tri-n-octylmethylammonium chloride | V, Cr, $Hg^{++}$, U, Ta, Zn |
| 36. | tridodecylmethylammonium chloride (tridodecylalkylammonium chloride) | Fe, Au, Zn |
| 37. | tridodecylalkylammonium iodide (tridodecylmethylammonium iodide) | Bi |
| 38. | tridodecylmethylammonium nitrate | Am, Bk, Ce, Cf, Cm, Eu, Au |
| 39. | di-n-alkylphosphoric acids e.g. di-n-butylphosphoric acid, etc. | Na |
| 40. | aminophosphoric acids e.g. mono-octyl ester -(2-carboxylanilino) benzyl phosphonic acid  | Ga, Zn |
| 41. | di-n-heptyl sulfoxide | U, Th |
| 42. | N-benzoyl-N-phenylhydroxyamine | Y, Hf, Nb, Zr, Lanthanides |

Figure 1:
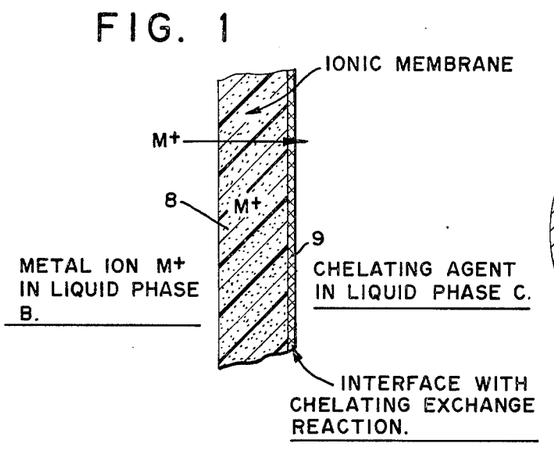
FIG. 1 illustrates a fragmentary segment of an ionic membrane with the chelating exchange reaction at the interface between the membrane and the organic phase C through which the metal value to be separated in accordance with the invention is passed.

As seen by reference to FIG. 1 of the drawing wherein a fragment of a typical membrane, shown in cross-section, is employed in extracting metal values M from an aqueous phase B. The metal values pass from the aqueous phase B, diffuse across membrane 8 and is extracted into the liquid C (containing the chelating agent) through the chelating exchange reaction at the interface 9 between the membrane and the organic phase C.

Figure 2:
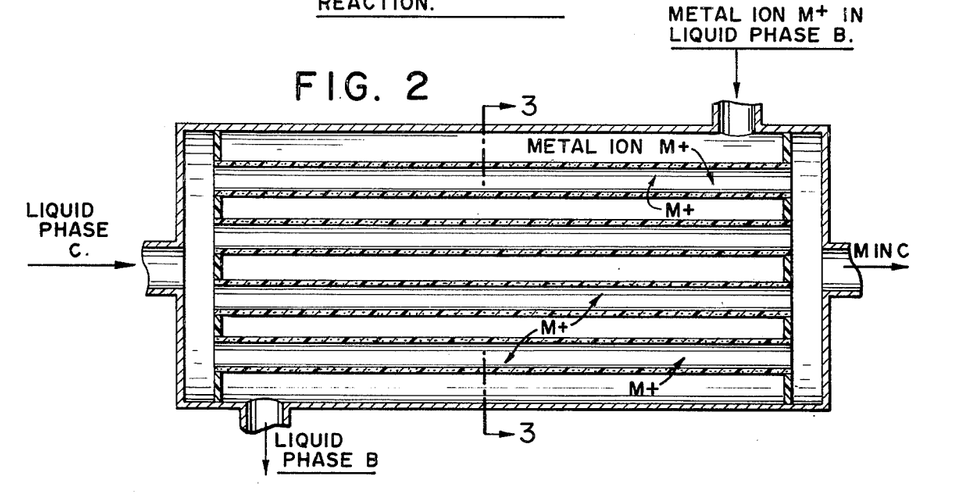
FIG. 2 depicts schematically a hollow fiber arrangement including reference to material flow for a typical extraction process.
Figure 3:
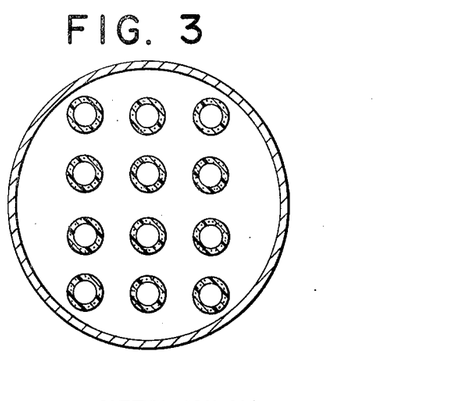
FIG. 3 is a cross-sectional schematic view of a hollow fiber arrangement of the kind shown in FIG. 2.
Figure 4:
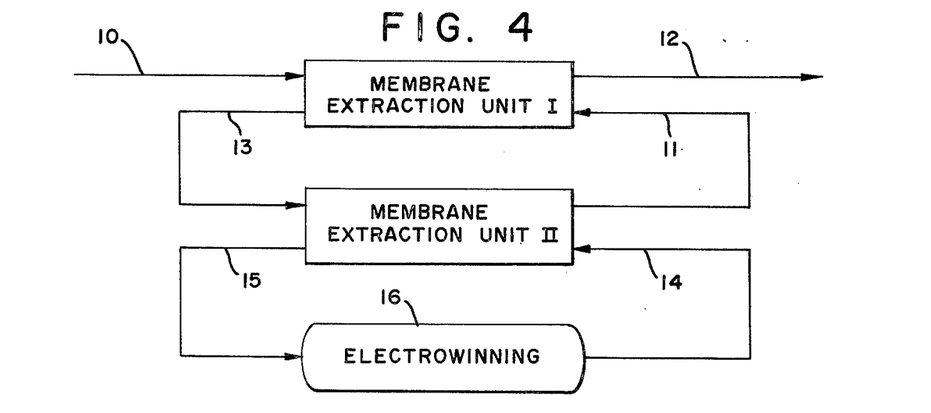
FIG. 4 is a typical flow diagram of a hydrometallurgical extraction process employing the two member extraction stages.

Referring to FIGS. 2 and 3 a chamber or housing in which a hollow fiber is suitably contained so that liquid phase C passes only through the hollow fiber while liquid phase B containing the metal M contacts the outer walls only of the hollow fiber is illustrated. A flow diagram for a typical hydrometallurgical extraction process employing a membrane of the invention is illustrated in FIG. 4. In this flow diagram, an inlet aqueous stream 10 is fed to the extraction process, e.g. at a rate of 933 gpm (gal/min) containing metal ions in water. Preferably, the pH is controlled so as to be below a pH of 2 or so as to be in excess of a pH of 8 by adjusting the acid concentration. For example, the stream 10 may comprise a leach stream containing 2.84 g/l $Cu^{++}$ and 4.5 g/l $H_2SO_4$ from the copper ore and is introduced into the membrane extraction unit I wherein the copper in stream 10 is extracted substantially into the organic stream 11 which is 7% 2-hydroxy-5-dodecyl-benzophenoxime (chelating agent) in heptane containing copper content of 0.15 g/l. at a flow rate in this instance of 1866 gpm. The input stream 10 is withdrawn from the extracting unit as stream 12 having copper content of 0.40 g/l and $H_2SO_4$ content of 8.3 g/l may be used as a leaching stream which is sent to leach copper ore. The organic stream 13 resulting from the after extraction, has a flow rate of 1866 gpm containing copper with a concentration of 1.37 g/l. Most of the amount of copper in stream 13 may be further extracted through a membrane extracting unit II. Through membrane extracting unit II, the copper in stream 13 is extracted by aqueous stream 14 which has a flow rate of 455 gpm, copper content of 29.2 g/l and sulfuric acid content of 150.1 g/l. After the extraction, the stream 13 becomes the organic stream 11 which is recycled to membrane extraction Unit I. The aqueous stream 14 is withdrawn from the extracting unit II as stream 15 having copper content of 34.2 g/l and sulfuric acid content of 142.4 g/l. Part of copper content in stream 15 is then removed as copper product through electrowinning step 16. After the electrowinning, the stream 15 becomes the stream 14 which is recycled back to the hollow-fiber extracting unit II.

In a case where multiple solutes in a stream are desired to be extracted separatively, an extracting process employing multi-staged membrane extracting units may be used, as described and shown in greater detail in said abandoned application Ser. No. 320,341. Any of various metals may be extracted in accordance with the invention from a solution of the metal.

Typical metals, for example, include any of the transition metals of Groups IB through group VIIB and VIII as well as the transition metal and rare earth metals, i.e., U, Ce, Pr, Nd, Pm, Sm, Eu, Gd, Tb, Dy, Ho, Er, Tm, Yb, Lu, Th, Pa, Np, Pu, Am, Cm, Bk, Cf, Es, Fm, Md, No, Lw, Al, Ga, In, Tl, Ge, Sn, Pb, Sb, Bi, Po, and preferably U, Cu, Zn, Pb, Au, Ag, Pt, Hg, Ni, Fe, Ti, V, Cr, Al.

The metals may be dissolved in the form of any of a variety of metal salts, e.g., sulfates, sulfites, chlorites, bromide, iodides, phosphates, phosphites, nitrates, nitrites perchlorates, chromates, chromites, permanganates and the like, preferably in an aqueous solution as the liquid phase B, shown in FIGS. 1 and 2.

Typical of the liquid extracting phase C in which the chelating agent is dissolved are any of the $C^5$ to $C^{18}$ hydrocarbons, halogen, nitrogen or oxygen substituted hydrocarbons, e.g. kerosene, n-heptane, n-pentane, n-hexane, n-octane, n-nonane, n-decane, chlorinated hydrocarbons such as chloroform and the like.

The following examples for which data are also summarized in accompanying Tables 2 and 3, are provided as illustrative of the present invention. The enumeration of details, however, is not to be considered as restrictive of the scope of the invention.

EXAMPLE 1

A diffusion cell with two compartments was used to carry out the membrane hydrometallurgical extraction. A hydrophilic type membrane was placed tightly between the two compartments. An aqueous phase containing a metal ion or metal ions was introduced into one of the compartments, while an organic phase containing a chelating agent or chelating agents was poured into the other compartment. The metal ion diffused from the aqueous phase and across the membrane, and was extracted into the organic phase through the chelating exchange reaction at the interface between the membrane and the organic phase. Measuring the concentration change in the organic phase and/or in the aqueous phase, an apparent diffusivity including all the mass transfer resistances between the aqueous phase and the organic phase was obtained by the aid of equation (1). In this example and the following example, all the diffusivities obtained and the membranes used are shown in Tables 2 and 3, respectively. In this example, Membrane 1 was employed. The membrane diffusion area was 20.78 cm². The chelating agent was 2-hydroxy-4-nonyl-benzophenoxime. The organic phase was 7% (by volume) chelating agent in n-pentane. The aqueous phase contained $CuSO_4$ and $H_2SO_4$. The volume of aqueous phase was 148 ml whereas that of organic phase was 133 ml. Initially, the aqueous phase contained 3 g/l $Cu^{++}$ and 4.5 g/l $H_2SO_4$; and the concentration of copper in the organic phase was 0. At the diffusion time of 1.38 × 10⁴ sec., the concentration of copper in the organic phase as determined was 0.496 g/l. The apparent diffusivity of copper of 1.31 × 10⁻⁶ cm²/sec was obtained. The temperature and the pressure were ambient.

EXAMPLE 2

The extraction was carried out following the same procedure as in Example 1. Membrane 1 was used. The membrane diffusion area was 20.78 cm². The chelating agent was 2-hydroxy-5-dodecyl-benzophenoxime. The organic phase was 7% (by volume) chelating agent in n-heptane. The aqueous phase was 146 ml whereas that of organic phase was 132 ml. Initially, the aqueous phase contained 3 g/l Cu$^{++}$ and 4.5 g/l H$_2$SO$_4$; and the concentration of copper in the organic phase was 0. At the diffusion time of 8.22 × 10³ sec., the concentration of copper in the organic phase as determined was 0.247 g/l. The apparent diffusivity of copper of 9.72 × 10$^{-7}$ cm²/sec was obtained. The temperature and the pressure were ambient.

EXAMPLE 3

The extraction was carried out following the same procedure as in Example 1. Membrane 2 was used. The membrane diffusion area was 20.78 cm². The chelating agent was 2-hydroxy-5-dodecyl-benzophenoxime. The organic phase was 7% (by volume) chelating agent in n-heptane. The aqueous phase contained CuSO$_4$ and H$_2$SO$_4$. The volume of aqueous phase was 243 ml whereas that of organic phase was 269 ml. Initially, the aqueous phase contained 3 g/l Cu$^{++}$ and 4.5 g/l H$_2$SO$_4$; the concentration of copper in the organic phase was 0. At the diffusion time of 8.66 × 10⁴ sec., the concentration of copper in the organic phase was 0.673 g/l. The apparent diffusivity of copper of 6.52 × 10$^{-7}$ cm²/sec was obtained. The temperature and the pressure were ambient.

EXAMPLE 4

The extraction was carried out following the same procedure as in Example 1. Membrane 2 was used. The membrane diffusion area was 20.78 cm². The chelating agent was 2-hydroxy-5-dodecyl-benzophenoxime. The organic phase was 7% (by volume) chelating agent in n-heptane. The aqueous phase contained CuSO$_4$ and H$_2$SO$_4$. The volume of aqueous phase was 245 ml whereas that of organic phase was 285 ml. Initially, the aqueous phase contained 3 g/l Cu$^{++}$ and 4.5 g/l H$_2$SO$_4$; and the concentration of copper in the organic phase was 0. At the diffusion time of 2.7 × 10⁴ sec., the concentration of copper in the organic phase was 0.30 g/l. The apparent diffusivity of copper of 8.0 × 10⁷ cm²/sec was obtained. The temperature and the pressure were ambient.

EXAMPLE 5

The extraction was carried out following the same procedure as in Example 1. Membrane 2 was used. The membrane diffusion area was 20.78 cm². The chelating agent was 2-hydroxy-5-dodecyl-benzophenoxime. The organic phase was 7% (by volume) chelating agent in cyclohexane. The aqueous phase contained CuSO$_4$ and H$_2$SO$_4$. The volume of aqueous phase was 254 ml whereas that of organic phase was 280 ml. Initially, the aqueous phase contained 3 g/l Cu$^{++}$ and 4.5 g/l H$_2$SO$_4$; and the concentration of copper in the organic phase was 0. At the diffusion time of 2.38 × 10⁵ sec., the concentration of copper in the organic phase was 0.695 g/l whereas that in the aqueous phase was 2.213 g/l. The apparent diffusivity of copper of 2.60 × 10$^{-7}$ cm²/sec was obtained by basing on the concentration analysis of organic phase whereas that of 2.71 × 10$^{-7}$ cm²/sec was obtained by basing on the concentration analysis of aqueous phase. The average apparent diffusivity was 2.65 × 10$^{-7}$ cm²/sec. The temperature and the pressure were ambient.

EXAMPLE 6

The extraction was carried out following the same procedure as in Example 1. Membrane 3 was used. The membrane diffusion area was 200.78 cm². The chelating agent was 2-hydroxy-5-dodecyl-benzophenoxime. The organic phase was 7% (by volume) chelating agent in cyclohexane. The aqueous phase contained CuSO$_4$ and H$_2$SO$_4$. The volume of aqueous phase was 245 ml whereas that of organic phase was 265 ml. Initially, the aqueous phase contained 3 g/l Cu$^{++}$ and 4.5 g/l H$_2$SO$_4$; and the concentration of copper in the organic phase was 0. At the diffusion time of 2.65 × 10⁵ sec., the concentration of copper in the organic phase was 0.82 g/l. The apparent diffusivity of copper of 2.92 × 10$^{-7}$ cm²/sec was obtained. The temperature and the pressure were ambient.

EXAMPLE 7

The extraction was carried out following the same procedure as in Example 1. Membrane 3 was used. The membrane diffusion area was 20.78 cm². The chelating agent was 2-hydroxy-5-dodecyl-benzophenoxime. The organic phase was 7% (by volume) chelating agent in n-heptane. The aqueous phase contained CuSO$_4$ and H$_2$SO$_4$. The volume of aqueous phase was 240 ml whereas that or organic phase was 277 ml. Initially, the aqueous phase contained 3 g/l Cu$^{++}$ and 4.5 g/l H$_2$SO$_4$; the concentration of copper in the organic phase was 0. At the diffusion time of 1.80 × 10⁵ sec., the concentration of copper in the organic phase as determined was 0.448 g/l. The apparent diffusivity of copper of 1.90 × 10$^{-7}$ cm²/sec was obtained. The temperature and the pressure were ambient.

EXAMPLE 8

The extraction was carried out following the same procedure as in Example 1. Membrane 3 was used. The membrane diffusion area was 20.78 cm². The chelating agent was 2-hydroxy-5-dodecyl-benzophenoxime. The organic phase was 7% (by volume) chelating agent in n-heptane. The aqueous phase contained CuSO$_4$ and H$_2$SO$_4$. The volume of aqueous phase was 240 ml whereas that of organic phase was 275 ml. Initially, the aqueous phase contained 3 g/l Cu$^{++}$ and 4.5 g/l H$_2$SO$_4$; the concentration of copper in the organic phase was 0. At the diffusion time of 2.53 × 10⁵ sec., the concentration of copper in the organic phase as determined was 0.115 g/l whereas that in the aqueous phase was 2.784 g/l. The apparent diffusivity of copper of 2.92 × 10$^{-8}$ cm²/sec was obtained by basing on the concentration analysis of organic phase whereas a diffusivity of 4.97 × 10$^{-8}$ cm²/sec was obtained by basing on the concentration analysis of aqueous phase. The average apparent diffusivity was 3.94 × 10$^{-8}$ cm²/sec. The temperature and the pressure were ambient.

EXAMPLE 9

The extraction was carried out following the same procedure as in Example 1. Membrane 3 was used. The membrane diffusion area was 20.78 cm². The chelating agent was 2-hydroxy-5-dodecyl-benzophenoxime. The organic phase was 7% (by volume) chelating agent in toluene. The aqueous phase contained CuSO$_4$ and $H_2SO_4$. The volume of aqueous phase was 245 ml whereas that of organic phase was 275 ml. Initially, the aqueous phase contained 3 g/l $Cu^{++}$ and 4.5 g/l $H_2SO_4$; and the concentration of copper in the organic phase was 0. At the diffusion time of $1.76 \times 10^5$ sec., the concentration of copper in the organic phase as determined was 0.180 g/l whereas that in the aqueous phase was 2.764 g/l. The apparent diffusivity of copper of $6.79 \times 10^{-8}$ cm$^2$/sec was obtained by basing on the concentration analysis of organic phase whereas a diffusivity of $8.02 \times 10^{-8}$ cm$^2$/sec was obtained by basing on the concentration analysis of aqueous phase. The average apparent diffusivity was $7.41 \times 10^{-8}$ cm$^2$/sec. The temperature and the pressure were ambient.

EXAMPLE 10

The extraction was carried out following the same procedure as in Example 1. Membrane 3 was used. The membrane diffusion area was 20.78 cm$^2$. The chelating agent was 2-hydroxy-5-dodecyl-benzophenoxime. The organic phase was 7% (by volume) chelating agent in n-octanol-1. The aqueous phase contained $CuSO_4$ and $H_2SO_4$. The volume of aqueous phase was 251 ml whereas that of organic phase was 265 ml. Initially, the aqueous phase contained 3 g/l $Cu^{++}$ and 4.5 g/l $H_2SO_4$; and the concentration of copper in the organic phase was 0. At the diffusion time of $9.21 \times 10^4$ sec., the concentration of copper in the organic phase was nearly 0. The apparent diffusivity of copper of smaller than $10^{-9}$ cm$^2$/sec was obtained. The temperature and the pressure were ambient.

EXAMPLE 11

The extraction was carried out following the same procedure as in Example 1. Membrane 4 was used. The membrane diffusion area was 20.78 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 240 ml whereas that of organic phase was 280 ml. Initially, the aqueous phase contained 3 g/l $Cu^{++}$ and 4.5 g/l $H_2SO_4$; and the concentration of copper in the organic phase was 0. At the diffusion time of $3.59 \times 10^5$ sec., the concentration of copper in the organic phase was 0.873 g/l. The apparent diffusivity of copper of $1.80 \times 10^{-7}$ cm$^2$/sec was obtained. The temperature and the pressure were ambient.

EXAMPLE 12

The extraction was carried out following the same procedure as in Example 1. Membrane 5 was used. The membrane diffusion area was 20.78 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 290 ml whereas that of organic phase was 329 ml. Initially, the aqueous phase contained 3 g/l $Cu^{++}$ and 4.5 g/l $H_2SO_4$; and the concentration of copper in the organic phase was 0. At the diffusion time of $3.31 \times 10^5$ sec., the concentration of copper in the organic phase was 0.127 g/l. The apparent diffusivity of copper of $4.38 \times 10^{-8}$ cm$^2$/sec. was obtained. The temperature and the pressure were ambient.

EXAMPLE 13

The extraction was carried out following the same procedure as in Example 1. Membrane 6 was used. The membrane diffusion area was 20.78 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 281 ml whereas that of organic phase was 316 ml. Initially, the aqueous phase contained 3 g/l $Cu^{++}$ and 4.5 g/l $H_2SO_4$; and the concentration of copper in the organic phase was 0. At the diffusion time of $1.74 \times 10^5$ sec., the concentration of copper in the organic phase was 0.144 g/l. The apparent diffusivity of copper of $5.90 \times 10^{-8}$ cm$^2$/sec was obtained. The temperature and pressure were ambient.

EXAMPLE 14

The extraction was carried out following the same procedure as in Example 1 except using a hydrophobic-type membrane. In this case, the metal ion diffused from the aqueous phase, was extracted into the membrane through the chelating exchange reaction at the interface between the membrane and the aqueous phase, and then diffused across the membrane to get into the organic phase. In this example, Membrane 7 was used. The membrane diffusion area was 20.78 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 230 ml whereas that of organic phase was 275 ml. Initially, the aqueous phase contained 3 g/l $Cu^{++}$ and 4.5 g/l $H_2SO_4$; and the concentration of copper in the organic phase was 0. At the diffusion time of $1.76 \times 10^5$ sec., the concentration of copper in the organic phase was 0.456 g/l. The apparent diffusivity of copper of $3.40 \times 10^{-8}$ cm$^2$/sec was obtained. The temperature and the pressure were ambient.

EXAMPLE 15

The extraction was carried out following the same procedure as in Example 1. Membrane 8 was used. The membrane diffusion area was 13.30 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 280 ml whereas that of organic phase was 315 ml. Initially, the aqueous phase contained 3 g/l $Cu^{++}$ and 4.5 g/l $H_2SO_4$; and the concentration of copper in the organic phase was 0. At the diffusion time of $1.68 \times 10^5$ sec., the concentration of copper in the organic phase was 0.195 g/l. The apparent diffusivity of copper of $5.60 \times 10^{-8}$ cm$^2$/sec was obtained. The temperature and the pressure were ambient.

EXAMPLE 16

The extraction was carried out following the same procedure as in Example 1. Membrane 9 was used. The membrane diffusion area was 13.30 cm$^2$. The chelating agent was 2-hydroxy-5-dodecyl-benzophenoxime. The organic phase was 7% (by volume) chelating agent in n-heptane. The aqueous phase contained $CuSO_4$ and $H_2SO_4$. The volume of aqueous phase was 232 ml whereas that of organic phase was 286 ml. Initially, the aqueous phase contained 3 g/l $Cu^{++}$ and 4.5 g/l $H_2SO_4$;

and the concentration of copper in the organic phase was 0. At the diffusion time of $3.61 \times 10^5$ sec., the concentration of copper in the organic phase was 0.255 g/l. The apparent diffusivity of copper of $5.92 \times 10^{-8}$ cm$^2$/sec was obtained. The temperature and the pressure were ambient.

EXAMPLE 17

The extraction was carried out following the same procedure as in Example 1. Membrane 10 was used. The membrane diffusion area was 13.30 cm$^2$. The chelating agent was 2-hydroxy-5-dodecyl-benzophenoxime. The organic phase was 7% (by volume) chelating agent in n-heptane. The aqueous phase contained CuSO$_4$ and H$_2$SO$_4$. The volume of aqueous phase was 295 ml whereas that of organic phase was 295 ml. Initially, the aqueous phase contained 3 g/l Cu$^{++}$ and 4.5 g/l H$_2$SO$_4$; and the concentration of copper in the organic phase was 0. At the diffusion time of $1.76 \times 10^5$ sec., the concentration of copper in the organic phase was 0.434 g/l. The apparent diffusivity of copper of $1.41 \times 10^{-7}$ cm$^2$/sec was obtained. The temperature and the pressure were ambient.

EXAMPLE 18

The extraction was carried out following the same procedure as in Example 1. Membrane 11 was used. The membrane diffusion area was 20.78 cm$^2$. The chelating agent was 2-hydroxy-5-dodecyl-benzophenoxime. The organic phase was 7% (by volume) chelating agent in kerosene. The aqueous phase contained CuSO$_4$ and H$_2$SO$_4$. The volume of aqueous phase was 295 ml whereas that of organic phase was 295 ml. Initially, the aqueous phase contained 3 g/l Cu$^{++}$ and 4.5 g/l H$_2$SO$_4$; and the concentration of copper in the organic phase was 0. At the diffusion time of $1.11 \times 10^6$ sec., the concentration of copper in the organic phase was 0.173 g/l. The apparent diffusivity of copper of $1.28 \times 10^{-8}$ cm$^2$/sec was obtained. The temperature and the pressure were ambient.

The applications of membrane solvent extraction are not limited to the systems enumerated above in the examples as well as in the tables. It can be applied for other hydrometallurgical extraction systems as well.

Various modifications apparent to those skilled in the art may be made without departing from the scope or spirit of the invention. Such modification, except as precluded by the claims, is within the purview of the invention.

TABLE II

Diffusivities in Membrane Hydrometallurgical Extraction

| Example No. | Chelating Agent | Organic Phase | Aqueous Phase | Membrane No. | Apparent Diffusivity of Metal (cm$^2$/sec) |
|---|---|---|---|---|---|
| 1 | 2-hydroxy-4-nonyl-benzophenoxime (LIX-64N) | 7% Chelating agent in n-pentane (by volume) | 3 g/l Cu$^{++}$ (as in sulfate) 4.5 g/l H$_2$SO$_4$ in H$_2$O | 1 | $1.31 \times 10^{-6}$ |
| 2 | " | 7% Chelating agent in n-heptane (by volume) | " | 1 | $9.72 \times 10^{-7}$ |
| 3 | " | " | " | 2 | $6.52 \times 10^{-7}$ |
| 4 | " | 7% Chelating agent in n-pentane (by volume) | " | 2 | $8.0 \times 10^{-7}$ |
| 5 | " | 7% Chelating agent in cyclohexane (by volume) | " | 2 | $2.65 \times 10^{-7}$ |
| 6 | " | " | " | 3 | $2.92 \times 10^{-7}$ |
| 7 | " | 7% Chelating agent in n-heptane (by volume) | " | 3 | $1.90 \times 10^{-7}$ |
| 8 | 2-hydroxy-5-benzophenoxime (LIX-64N) | 7% Chelating agent in kerosene (by volume) | 3 g/l Cu$^{++}$ (as in sulfate) 4.5 g/l H$_2$SO$_4$ in H$_2$O | 3 | $3.94 \times 10^{-8}$ |
| 9 | " | 7% Chelating agent in toluene (by volume) | " | 3 | $7.41 \times 10^{-8}$ |
| 10 | " | 7% Chelating agent in n-octanol-1 (by volume) | " | 3 | $<10^{-9}$ |
| 11 | " | 7% Chelating agent in n-heptane (by volume) | " | 4 | $1.80 \times 10^{-7}$ |
| 12 | " | " | " | 5 | $4.38 \times 10^{-8}$ |
| 13 | " | " | " | 6 | $5.90 \times 10^{-8}$ |
| 14 | " | " | " | 7 | $3.40 \times 10^{-8}$ |
| 15 | " | " | " | 8 | $5.60 \times 10^{-8}$ |
| 16 | 2-hydroxy-5-dodecyl benzophenoxime (LIX-64N) | 7% Chelating agent in n-heptane (by volume) | 3 g/l Cu$^{++}$ (as in sulfate) 4.5 g/l H$_2$SO$_4$ in H$_2$O | 9 | $5.92 \times 10^{-8}$ |
| 17 | " | " | " | 10 | $1.41 \times 10^{-7}$ |
| 18 | " | 7% Chelating agent in | " | 11 | $1.28 \times 10^{-8}$ |

TABLE II-continued

Diffusivities in Membrane Hydrometallurgical Extraction

| Example No. | Chelating Agent | Organic Phase | Aqueous Phase | Membrane No. | Apparent Diffusivity of Metal (cm²/sec) |
|---|---|---|---|---|---|
| | | kerosene (by volume) | | | |

TABLE III

Membranes Used In Membrane Hydrometallurgical Extraction

| Membrane No. | Description of the Membrane | Membrane Thickness (mil) | Example No. |
|---|---|---|---|
| 1 | Polypropylene film treated with 1-stage styrenation with 2% DVB (divinyl benzene) to have 33.6% styrene content, then 4% hr. sulfonation with 5% ClSO₃H | 5.5 | 1,2 |
| 2 | Same as above (Membrane 1) except 7.5 hr. sulfonation | 5.5 | 3,4,5 |
| 3 | Polypropylene film treated with 1-stage styrenation with 2% DVB to have 37% styrene content, then 4 hr. sulfonation with 10% ClSO₃H | 5.5 | 6,7,8,9,10 |
| 4 | Low density polyethylene film treated with 1-stage styrenation with 0.6% DVB, then 3 hr. sulfonation | 3.8 | 11 |
| 5 | High density polyethylene film treated with 2-stage styrenation with 0.6% DVB, then 8 hr. sulfonation | 1.52 | 12 |
| 6 | High density polyethylene film treated with 1-stage styrenation with 0.6% DVB, then 7 hr. sulfonation | 1.43 | 13 |
| 7 | Porous polypropylene membrane | 0.9 | 14 |
| 8 | Cast membrane from 45% partially charged polystyrene sulfonic acid | 2.23 | 15 |
| 9 | Cast membrane from polyvinyl alcohol | 4.13 | 16 |
| 10 | Cast membrane from 10% LiCl, 22.5% lauryl lactam, 28.4% BAMP (poly-[1,7(4-methyl)azaheptane-adipamide]), 39.1% nylon | 2.31 | 17 |
| 11 | BC-50 (from Amicon Corporation, polyelectrolyte complex with 50% excess polysulfonate) | 6.41 | 18 |

It is apparent that many modifications and variations of this invention as set forth may be made without departing from the spirit and scope thereof. The specific embodiments described are given by way of example only, and the invention is limited only by the terms of the appended claims.

We claim:

1. A process for the recovery of metal values from a solution thereof in a first liquid phase which comprises the steps of contacting one side of a membrane with a first liquid phase containing a metal M dissolved therein, contacting the other side of said membrane with an extracting second liquid phase, wherein one of said phases is an organic liquid which contains a chelating agent which forms a complex with said metal and wherein the other phase is an aqueous liquid, and extracting said metal from said first liquid phase through said membrane by maintaining said liquids on the respective sides of said membrane until said metal M has substantially diffused from the first to the second phase.

2. The process of claim 1 wherein the membrane comprises a hollow fiber.

3. The process of claim 1 wherein the membrane comprises an ionic composition.

4. The process of claim 1 wherein the membrane comprises a hollow fiber structure of ionic composition.

5. The process of claim 1 wherein said first liquid is acidic with pH less than 2.

6. The process of claim 1 wherein said first liquid is basic and has a pH in excess of 8.

7. The process for the recovery of metal values from a solution thereof which comprises the steps of contacting one side of a membrane with an aqueous liquid phase containing a metal M dissolved therein and contacting the other side of said membrane with an extracting organic liquid phase which has dissolved therein a chelating agent which forms a complex with said metal, extracting said metal from said aqueous phase through said membrane whereby a complex of said metal and chelating agent is formed as the metal value passes into said organic phase and maintaining said liquid phases on the respective sides of said membrane until said metal M has been substantially diffused into and forms a complex in organic phase.

8. The process of claim 7 wherein the metal value is extracted from said complex by subsequent extraction of said complex containing organic phase with an aqueous phase.

9. The process of claim 8 wherein said extraction from the organic phase utilizes a membrane to separate the aqueous phase from the organic phase.

10. The process of claim 9 wherein the membrane is ionic.

11. The process of claim 9 wherein the membrane is a hollow fiber.

12. The process of claim 9 wherein the membrane is an ionic hollow fiber.

13. The process of claim 7 wherein said organic phase is pentane.

14. The process of claim 7 wherein said second liquid is heptane.

15. The process of claim 7 wherein said second liquid is kerosene.

16. The process of claim 7 wherein said second liquid is heptane and contains the chelating agent 2-hydroxy-5-dodecyl benzophenoxime.

17. The process of claim 7 wherein said metal is copper.

18. The process of claim 7 wherein said metal is uranium.

19. The process of claim 7 wherein said metal is copper and chelating agent is 2-hydroxy-5-dodecylbenzophenoxime.

20. The process of claim 7 wherein the metal is uranium and the chelating agent is di-(2-ethylhexyl) phosphoric acid and tri-n-octyl-phosphine oxide.

21. The process of claim 7 wherein the extraction of the metal M is effected at atmospheric pressure and at a temperature of from about the freezing point of the solutions to about 200°C.

22. The process of claim 7 wherein said membrane is characterized by having a diffusivity of about $1 \times 10^{-9}$ to about $1 \times 10^{-4}$ cm$^2$/sec.

23. The process of claim 22 wherein the membrane is ionic.

24. The process of claim 22, wherein the metal is copper, the membrane is styrenated sulfonated polypropylene and the chelating agent is 2-hydroxy-5-dodecyl benzophenoxime.

25. A process for the recovery of metal values from an organic phase comprising a solution of a complex of the metal and a chelating agent which comprises the steps of contacting one side of a membrane with said organic phase containing the metal and contacting the other side of said membrane with an extracting aqueous phase, extracting said metal from the complex in said organic phase through said membrane into said aqueous phase and maintaining said liquid phases on the respective sides of said membrane until said metal M has been substantially diffused into said aqueous phase.

26. The process of claim 25 wherein the membrane is ionic.

27. The process of claim 25 wherein the membrane is a hollow fiber.

28. The process of claim 25 wherein the membrane is an ionic hollow fiber.

* * * * *